US006456274B1

(12) United States Patent
Van Hemert

(10) Patent No.: US 6,456,274 B1
(45) Date of Patent: Sep. 24, 2002

(54) MULTI-MEDIA EDITING SYSTEM FOR EDTING AT LEAST TWO TYPES OF INFORMATION

(75) Inventor: Jan P. Van Hemert, Linsköping (SE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/951,291

(22) Filed: Oct. 16, 1997

Related U.S. Application Data

(63) Continuation of application No. 08/318,032, filed on Oct. 4, 1994, now abandoned, which is a continuation of application No. 07/912,926, filed on Jul. 13, 1992, now abandoned.

(30) Foreign Application Priority Data

Jul. 11, 1991 (EP) .............................................. 91201804

(51) Int. Cl.[7] ................................................. G09G 5/22
(52) U.S. Cl. ....................................... 345/141; 704/276
(58) Field of Search ................................ 340/724, 706, 340/735; 381/42–48; 358/462, 452, 488; 345/121, 156, 143, 157, 141, 128, 129, 130, 115, 116; 395/2.44, 2.69, 2.84, 2.85, 2.87; 704/275, 276, 246, 260

(56) References Cited

U.S. PATENT DOCUMENTS

| 4,618,991 A | | 10/1986 | Tabata et al. .................. 382/46 |
|---|---|---|---|
| 4,689,817 A | * | 8/1987 | Kroon ........................ 395/2.69 |
| 4,723,297 A | | 2/1988 | Postl ........................... 382/46 |
| 4,759,076 A | | 7/1988 | Tanaka et al. ................. 382/46 |
| 4,779,209 A | * | 10/1988 | Stapleford ................. 395/2.87 |
| 4,837,831 A | * | 6/1989 | Gillick et al. .................. 381/42 |
| 4,910,765 A | * | 3/1990 | Matsuse et al. | 
| 4,972,486 A | * | 11/1990 | Cornett et al. ................. 381/48 |
| 5,093,653 A | * | 3/1992 | Ikehira ....................... 340/724 |
| 5,191,612 A | * | 3/1993 | Katsuyama et al. ......... 358/462 |
| 5,220,611 A | * | 6/1993 | Nakamura et al. ............. 381/48 |
| 5,359,695 A | * | 10/1994 | Ohora et al. ............... 395/2.44 |

OTHER PUBLICATIONS

IBM Systems Application Architecture, Common User Access Advanced Interfce Design Guide SC26–4582–0 Jun. 1989 pp. 16–49.

"An Interpersonal Multimedia Visualization System" IEEE Computer Graphics and Applications, R. Phillips vol. 11, No. 3, may 1991, New York, NY 20–27.

"Computer Aided Film Sound Editing" Audio Engineering Society Preprint of the 76th Convention, A. Marr, Oct. 8, 1984, pp. 1–13.

"Layering Approach Manages Mixed Documents" Horak et al, Electronic Design vol. 30, No. 8 Apr. 1982, pp. 49–54.

* cited by examiner

*Primary Examiner*—Chanh Nguyen
(74) *Attorney, Agent, or Firm*—Brian J. Wieghaus

(57) ABSTRACT

A text processing system has display of text as a page of characters. The user interface comprises a set of editing actions that are activatable by mouse and/or keyboard actuations. Furthermore, secondary display modes are provided for audio or fax, which can be edited by at least a subset of the text editing actions. Representation of audio is as pseudo characters.

22 Claims, 7 Drawing Sheets

Speech technology

Nowadays practically every firm that respects itself has a project in the field of speech technology. There are three main reasons why this field flourishes today: first the increase in computer capacity, second the digitization of telephone networks and third the attention payed to man/machine interfaces.

Let us start with the first reason. There is no business like the computer business. The technology races forward and the number of MIPS and Megabytes available in computers is ever increasing. With this tendency the use of speech technology comes within reach. To start with MIPS: many speech processing programs consume quite a lot of that. Speech is essentially a real time signal and if you cannot process it with that timing requirement you cannot use speech. The second point is Megabytes: speech also consumes quite a lot of that. Up to now computers have to a large extent been based on typed text with storage in an ASCII file with one byte per character. By assuming a speech rate of twenty phonemes (sounds like a vowel or a consonant) per second speech files are three orders of magnitude larger than the equivalent text files. This means that the byte per character needs to be replaced by a kbyte. The decrease of memory prices brings speech storage applications within reach.

The second reason for speech technology is the digitization of telephone networks. The telephone is a device that has always worked with speech. In the coming years the ISDN (Integrated Services Digital Network) will be introduced. This will lead to an integration of speech and data (this is the main topic of an advertisement campaign by Siemens). Now the telephone goes digital, many speech programs will need to be written and computers will have the special devices (like a microphone and a speaker) to make use of speech. We are heading for a future where computers will be interconnected over networks, such as ISDN, and where speech will be an integral part of the machine and the user interface.

The third reason to look into speech technology is the fact that much emphasis is put man/machine interfaces. If we want to have computers accepted in abroad circles in our society, we have to make them more user friendly. In human communication speech is widely used. Practically all normal everyday messages are transmitted with speech and text is used for more formal purposes. However, todays computers communicate mainly with text. Listening and talking computers are often used in science fiction stories. It is rather obvious why the story writers choose a speech interface. It is a good way to introduce a layman into the computer world. However, talking computers are not as futuristic as they seem. In the Muppet-labs all over the world, where the future is being made today, the doctors Honeydew and their assistants Beacon are developing such machines and they will come on the market and into your homes in the next decade.

FIG. 2

We know that, where possible, data is reduced to alphanumeric form for transmission by communication systems. However, this can be expensive, and also some data must remain in graphic form. For example, we cannot key-punch an engineering drawing or weather map. I think we should realize that high speed facsimile transmissions are needed to overcome our problems in efficient graphic data communication. We need research into graphics data compression.

Any comments?

Albert.

FIG. 4

TABLE 3.A: MOUSE EVENTS AND THEIR ACTIONS WITHIN THE MULTIMEDIA EDITOR

| MOUSE EVENT | ACTION |
| --- | --- |
| SINGLE CLICK BUTTON DOWN AND UP WITHOUT MOVING THE MOUSE. | POSITION CURSOR AT THE MOUSE POSITION |
| DOUBLE CLICK TWO SINGLE CLICKS WITHIN A CERTAIN TIME INTERVAL | SELECT THE WORD AT WHICH THE MOUSE POINTS |
| TRIPLE CLICK THREE SINGLE CLICKS WITHIN A CERTAIN TIME INTERVAL | SELECT THE WORD AT WHICH THE MOUSE POINTS |
| DRAG BUTTON DOWN, MOVE MOUSE, BUTTON UP | SELECT THE AREA BETWEEN THE MOUSE POSITION AT THE BUTTON DOWN AND THE MOUSE POSITION AT BUTTON UP |

FIG. 8

TABLE 3.B: ACTIONS AND WHAT CHANGES IN THE EDITOR

| ACTION | CHANGES |
| --- | --- |
| POSITION CURSOR | A VERTICAL LINE IS PLACED AT THIS POSITION |
| SELECT | THE SELECTED AREA IS DISPLAYED IN INVERSE VIDEO |
| TYPING/RECORD | THE SELECTED PSEUDO CHARACTERS ARE DELETED FROM THE PAGE AND REPLACED BY THE TYPED OR RECORDED PSEUDO CHARACTERS |
| COPY | THE SELECTED PSEUDO CHARACTERS ARE COPIED TO THE CLIPBOARD |
| CUT | THE SELECTED PSEUDO CHARACTERS ARE DELETED FROM THE PAGE AND COPIED TO THE CLIPBOARD |
| PASTE | THE CONTENT OF THE CLIPBOARD IS COPIED ONTO THE PAGE |

FIG. 9

MULTI-MEDIA EDITING SYSTEM FOR EDTING AT LEAST TWO TYPES OF INFORMATION

BACKGROUND OF THE INVENTION

This is a continuation of application Ser. No. 08/318,032, filed Oct. 4, 1994, now abandoned which is a continuation of application Ser. No. 07/912,926 filed on Jul. 13, 1992, now abandoned.

FIELD OF THE INVENTION

The invention relates to a text processing system comprising a pagewise text display based on character representability. The system also includes text processing and text storage sub-systems and a user interface featuring a set of text manipulating actions activatable through mechanical user actuation of an appropriate input devise. Various professional and personal computer systems have text processing systems. An exemplary reference is the "Common User Access Advanced Interface Design Guide" for the IBM Operating System/2, by IBM, June 1989, Document SY0328-300-R00-1089, pages 33–42. Text is represented as characters according to one or more of the following formats, free-formatable, connected or non-connected. Manipulating actions have been designed in a wide variety as will be described hereinafter. In this way the formatting of the text can be effected at many levels include character, word, line, block, window, paragraph, page or other, while various actions such as insert, delete, cut, clip, paste and others are useful. In the effecting of those actions, the multilevel structure of representation of the text has been found useful. The most commonly used input devices based on such mechanical user actuation are hard keyboard and mouse. However, various other devices such as track ball, touch screen, or writing stylus can be used.

SUMMARY OF THE INVENTION

It is an object of the invention to support representation of other communication media and their processing by means of an interface that to an appreciable extent is uniform among various media. The invention realizes this object by representing such media as a text metaphor in that the display has an audio display mode on line-wise pseudo character representation. The audio display mode features at least a first subset of the set of text manipulating actions which operate on displayed audio in a similar way as on displayed text. Each of the latter actions has a mapped effect on the actual stored audio corresponding to the displayed pseudo characters. The time sequence of audio governs the progression of its display along successive lines. For easy accessibility the audio signal is represented as pseudo-characters such as tiny blocks with the height dependent on audio intensity. In particular, space characters function as delimiters between contiguous audio segments that are separated by a pause. Such a pause can be detected as occurring in the audio input, such as the end of a word or sentence. In an alternative realization, any pause character is a default item in that selectively, audio may be input into selective positions, i.e. time instants, such as in filling in a form or questionnaire with audio answers. In this way, audio is indeed processed as a text metaphor. The correspondence among the various actuations makes life easier for any experienced user. On the other hand, the mapping of various manipulating actions on various input devices need not be uniform among text and audio. And even for a single object, certain manipulations may be restricted to a particular input device as differing from other manipulations and/or another object.

Advantageously the audio is voice at a linewise display scale that is comparable to text display, and comprising delimiters as signalizations of detected silence instants. The duration of a word or line of text would then correspond in display space to the display of that many characters in textual representation. Their correspondence in physical space would be readily visible to a user. The silence delimiters correspond to ends of words or sentences in written text.

Advantageously the display has a fax display mode based on a linewise representation of the fax. The fax mode features at least a second subset of the set of text manipulating actions operating on a displayed fax area in a similar way as on displayed text. Fax is defined as text represented by a bit map, wherein the character/word content or format may be uncertain in any degree, and wherein in principle, any two-dimensional format is allowable. It has been found that composing in a fax page would be advantageous as well, such as transmitting text together with non-textual material, supplementing a received fax with typewritten text, moving parts of a facsimile page with respect to other parts, and many others. The subsets of actions relating to audio and fax pages, respectively, may be, but need not be identical. The difference between text and fax information, is that the system does not know the meaning of the fax information. Even with a character recognition feature, only an approximate knowledge exists.

Advantageously, the system has user controlled skew correcting means for correcting the skew of a particular line of fax. Word select is possible if the skew is small over the word length, which is usually the case. Line select is possible if the skew over the line length is small compared to the line height. If this is not the case, the operator may manually correct the skew users, in-processor algorithms that are rather elementary. These algorithms have been described in U.S. Pat. Nos. 4,618,991 and 4,759,076. Editing in the sense of the present invention has been described by these references, however.

Advantageously, the system has orientation detection capability for detecting a local orientation of a displayed fax text line for allowing word and/or line select by the actions along a detected line. Whereas the earlier approach works if the adjustment required is not too great (say, up to some 20°) and is more or less uniform over a page, problems can occur if the skew is very large (up to 90°) and/or is severely non-uniform over a page, such as would occur in handwriting. In that case, the orientation of the line is detected, such as has been described in U.S. Pat. No. 4,723,297, which may, in principle, be done separately for each line. The detection may be followed by correction, if feasible, or the editing may be executed directly on the slanting uncorrected line.

Various advantageous aspects are recited in dependent claims.

BRIEF DESCRIPTION OF THE DRAWINGS

The invention will be further disclosed according to the appended Figures that successively show:

FIGS. 2–7 illustrates various display formats;

FIGS. 8-9 are tables of actions.

DESCRIPTION OF A PREFERRED EMBODIMENT

Figure 1:
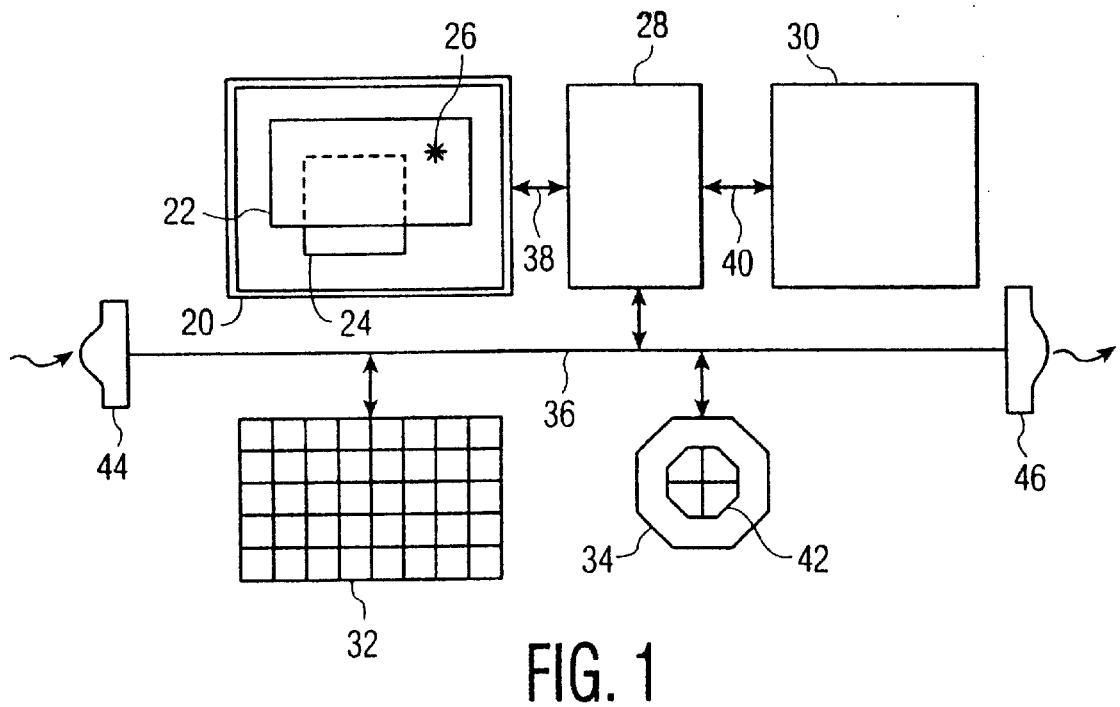
FIG. 1 shows a general diagram of a computer system.

FIG. 1 is a general diagram of a keyboard-oriented computer system. The system includes a page display 20.

Also indicated are a foreground window 22, a partially covered window 24 and a cursor 26. The display may be based on a standard character set, or it may be high definition in that for each character an arbitrary bit map may be chosen. A processor 28 may execute text processing as well as system software. Memory 30 stores data to be displayed and other data. A keyboard 32 receives user actuations to be translated into system actions. A mouse 34 can be used to input absolute or differential positions in conjunction with clicking actions on any of four buttons 42. A block 44 represents a microphone with associated conversion mechanism to n-bit audio samples, that may be encoded, modulated, filtered, and, as the case may be, used in a voice recognition subsystem. The value of n of course, as well as the frequency of the samples, audio processing and other technology relevant to digital audio, relate to intended quality. A second block 46 represents a loudspeaker that may output digital received audio samples via error correction, demodulation and digital-to-analog conversion to continuous audio. In addition to this, audio may remain analog if editably stored on a suitable medium. In principle, all audio editing may be done on an analog level, such as replacing, inserting, dubbing, fading and superposing, inasmuch as the invention proper relates to the interfacing with signalization of the audio. In the Figure, no analog storage has been provided and all operation is digital. Further communication lines 36, 38, 40 interconnect the subsystems shown. The configuration shown can be expanded or shrunk to any feasible degree, by means of:

background memory external data communication adapted functionality of subsystems other I/O, such as graphics I/O (also called -mouse- hereinafter, such as soft keys, joystick)

other storage, such as tape other communication pattern, instead of 36, 38, 40.

For brevity, FIG. 1 does not show the conversion of audio to pseudo characters. According to various discrimination thresholds, for the average audio amplitude, the pseudo-characters in the present embodiment may have any of four non-zero heights as shown in FIGS. 2–7. Of course, other numbers are feasible. The translation of a particular digitized amplitude to a geometric representation is by converting amplitude to an address code for a character generator that generates a pseudo-character in the same way as standard characters. Other representations are feasible, such as dots of various diameters (the diameter now linked to amplitude), blocks with various greyness levels and/or colours, or other. The mapping of the audio on the pseudo-characters may be two-dimensional, such as by discriminating both audio level and audio pitch. This would, for example, elucidate a dialog between a male voice and a female voice. The mapping coordinates could now be both size and colour of the pseudo-characters.

FIGS. 2–7 show various display formats. FIG. 2 is a text format, having 53 rows of 65 characters each. In the example, characters are in print, with left-side and right-side registration, uniform periodicity and uniform line height The content of this page is irrelevant to the invention as well as to the disclosure thereof. The format need not be uniform. It may be given by a shape description instead of by the shape itself, such as in the well-known Postscript® system.

Figure 3:
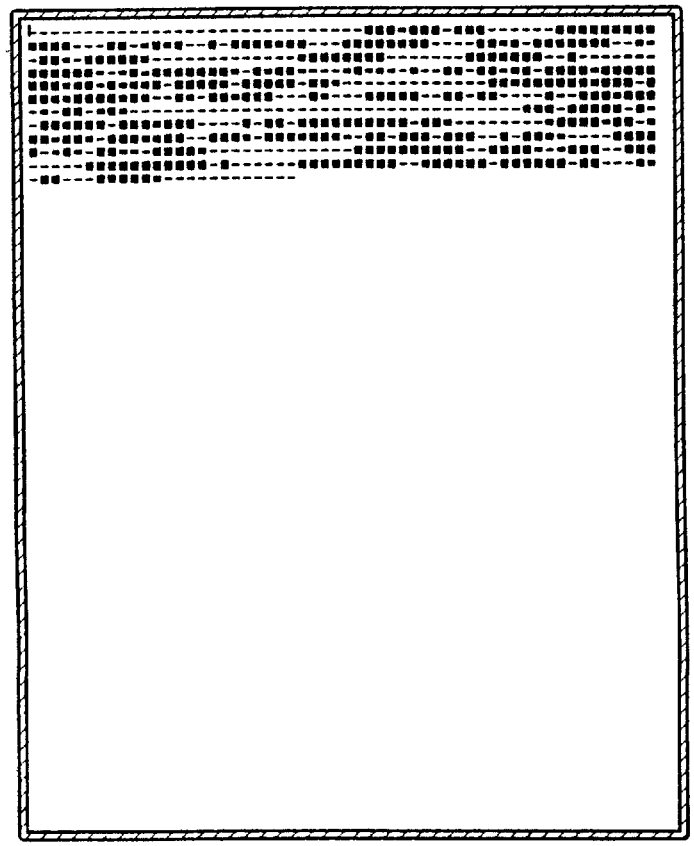

FIG. 3 is a voice format. Each character represents a voice period of about 1/20 of a second. The height of a block corresponds to the amplitude or energy of the voice segment. The pseudo characters have about the same width as the characters of FIG. 2. An interrupted line indicates the connected sequence. Other representations are possible. Colour could indicate raised pitch such as at the end of a questioning phrase. Also other voice characteristics may be indicated such as the respective speakers in a conversation each having their own colour. Apart from the height other shapes of the pseudo characters would be feasible to indicate various natural or artificial characteristics. Examples are marks for end-of-sentence, echo, machine generated speech versus recorded speech. The representation can be used for voice, music, animal sound, machine sound, background noise from machines, natural noise, and other.

FIG. 4 is a fax format that is organized according to standard horizontal lines and provided with word rasters. The fax may be represented as it is received or produced. Alternatively, it may be represented as a string of blocks of varying lengths. Such block that may itself be considered as a pseudo-character, may be detected by a known segmentation algorithm. These pseudo-characters may be represented in similar way as has been explained with respect to audio herebefore. The content of the fax message itself is irrelevant to the present invention as well as to the disclosure thereof. The advantage of using such pseudo characters is, for example, that the content of the fax may remain unknown to an operator (who only selects particular parts, or executes other text processing for which the content of the text need not be known). Another example is that such representation discretely shows the empty spaces even if the full text could give rise to ambiguities. The raster shown may be omitted if advantageous. The representation may be a combination of the fax text itself in combination with the block structure. It may be feasible to alternate between the two representations. The case of slanted lines has been discussed earlier. The fax may comprise a combination of text or texts (at respective slanting angles) and non-textual material such as Figures.

Figure 5:
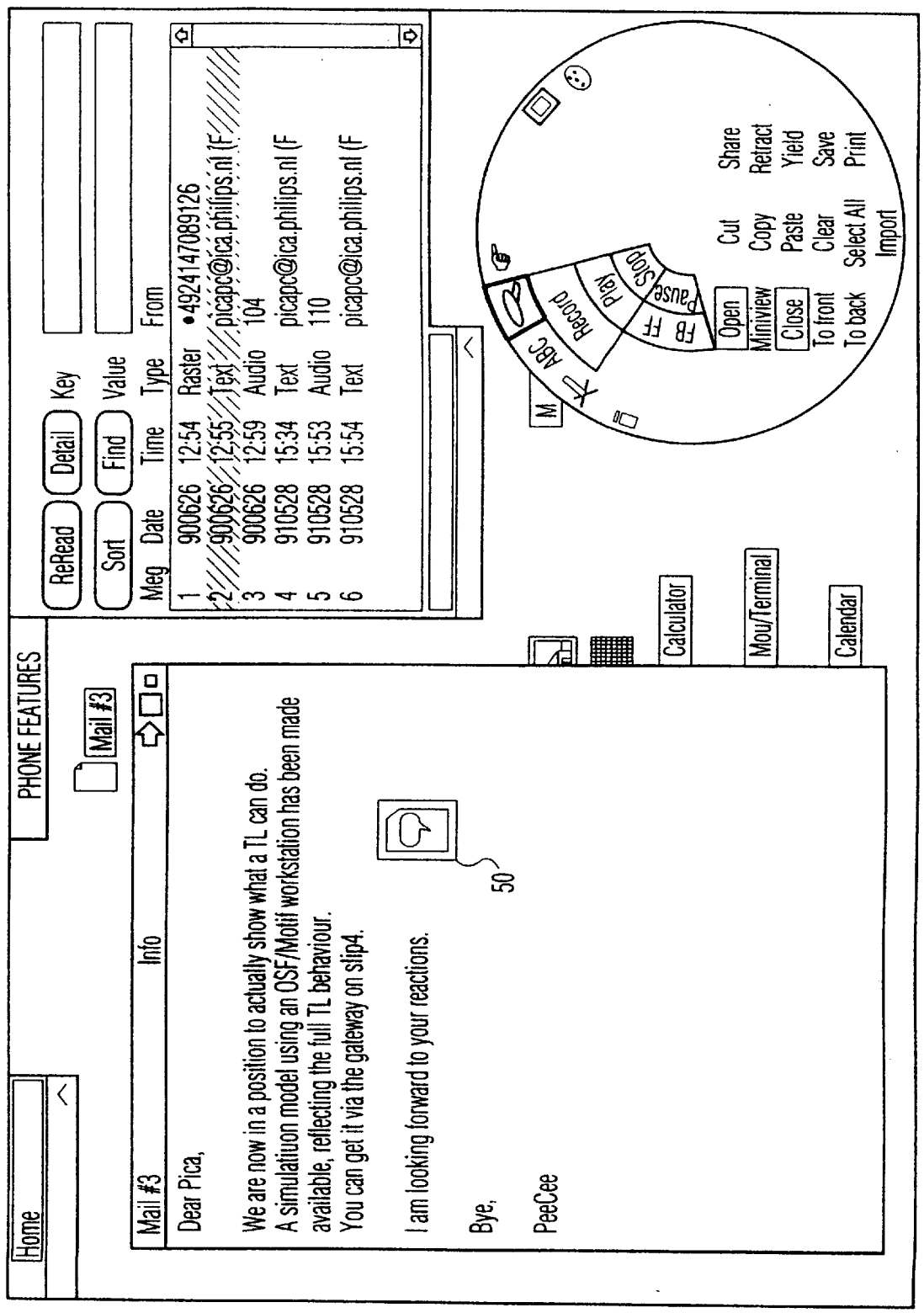

FIG. 5 shows at left, a text page with a so-called audio sticker on it, representing a non-open voice sheet in iconized state. In this state, it is possible to play the stored voice relating to this sheet and also to record new voice (or other audio), which is thereupon joined to this sheet. The activating of this functionality is effected by accessing of icon 50 that shows a stylized quote mark. However, only an open sheet leads to full editing functionality. The right hand side of the display shows various items and windows that are irrelevant to the present invention and are mousewise accessible.

Figure 6:
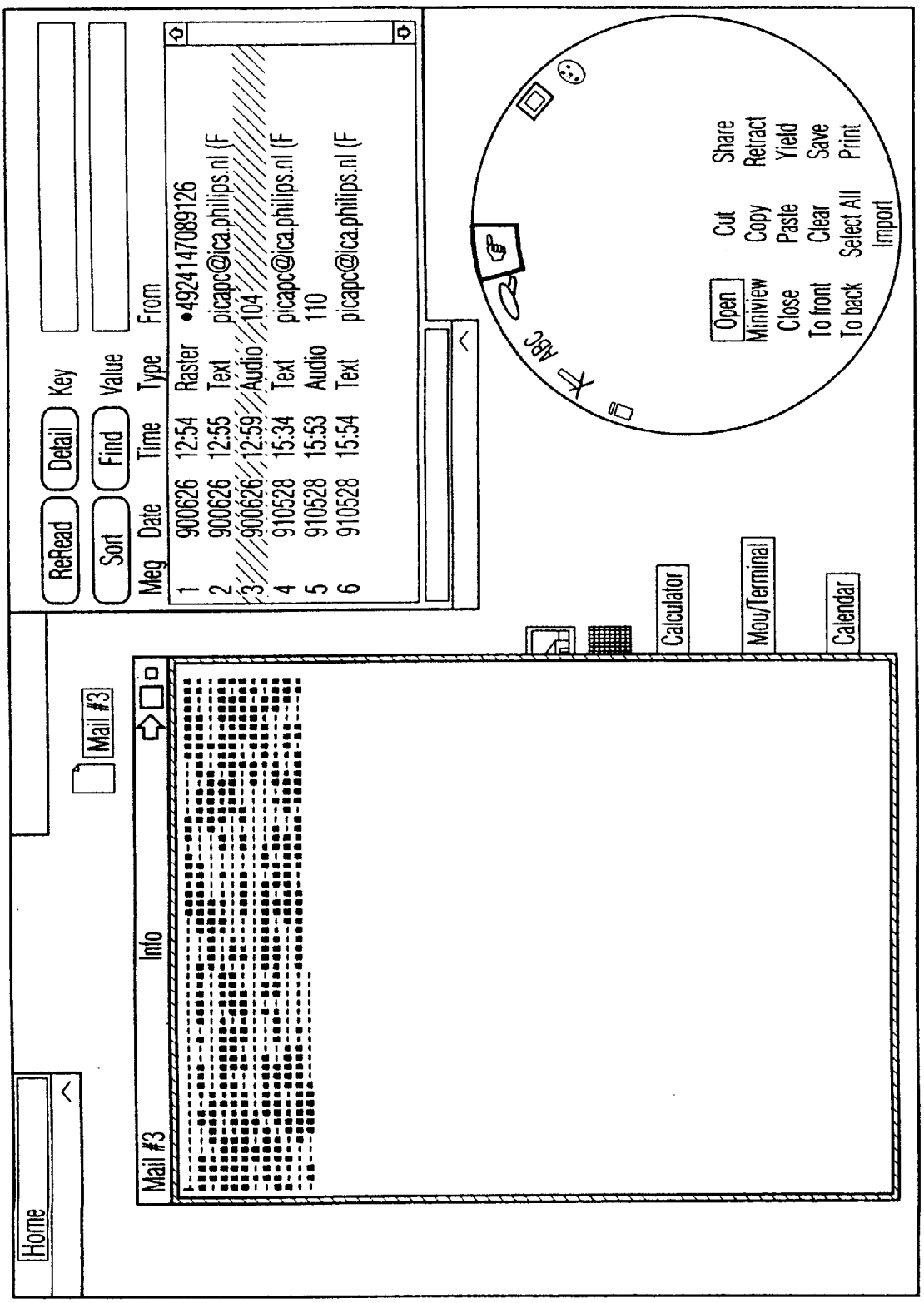

FIG. 6 shows an open voice sheet, cf. the downstepping of the dark strip at right-hand side through the select column, with respect to FIG. 5. This open sheet allows full-featured editing. Instead of a text font there is a block font indicating the amplitudes. There is a cursor in the left upper corner similar to a text cursor. New input (by recording) is inserted depending on the location of the cursor. Just as with text, the user can select some part and use the cut, copy and paste operations. This makes it an audio editor, more than just a cassette recorder. The cursor can be placed at a special position by a mouse click. But the user can also make use of the feature, in which cursor moves during play. Pressing "stop" will leave the cursor at the current position.

Figure 7:
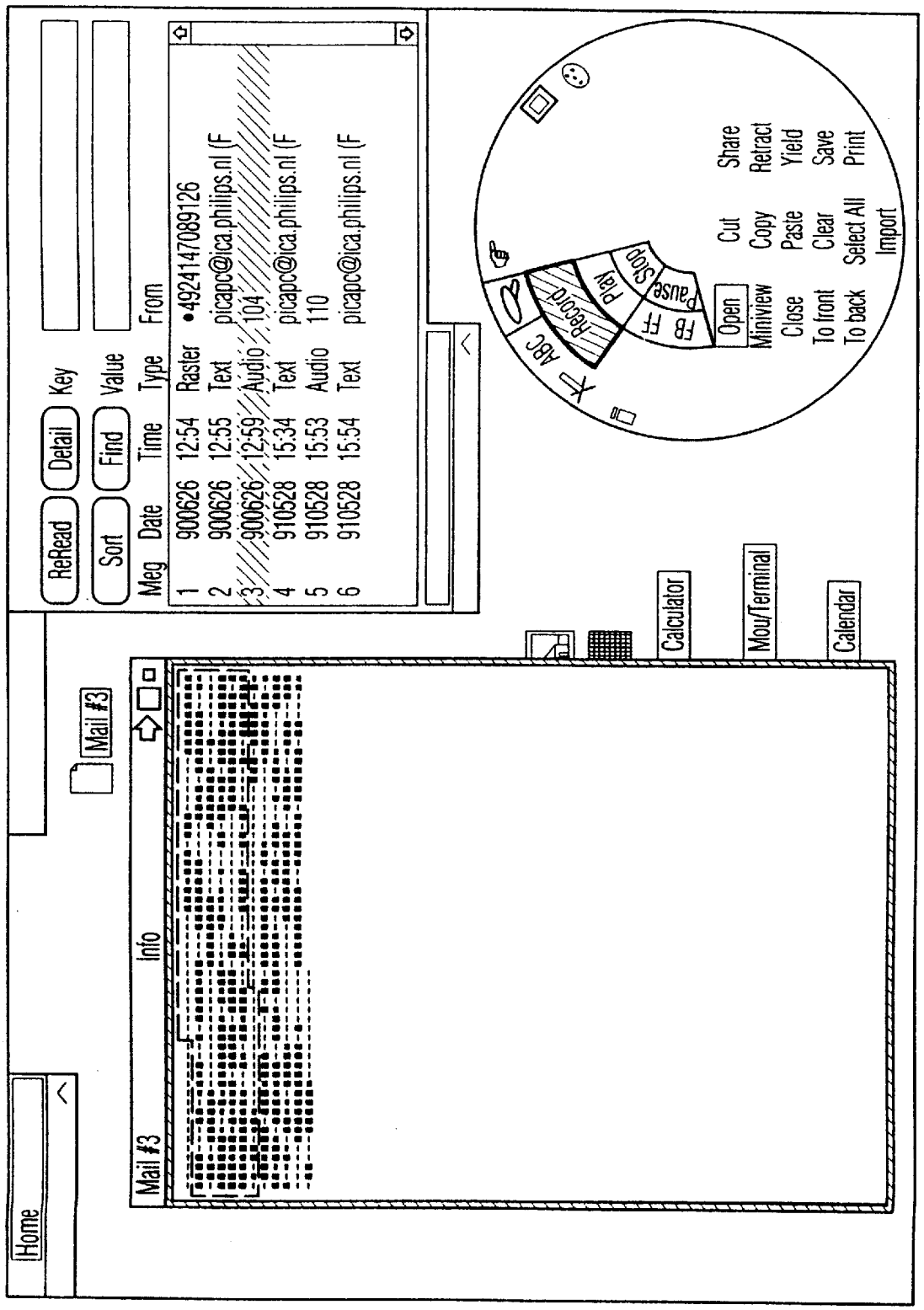

If there is some part selected, the command is restricted to that selection. E.g. the user first wants to listen to a selection before deciding to cut it. FIG. 7, shows a selection of a segment that has about 6½ lines of pseudo characters by inverted video.

FIGS. 8-9 show tables of various actions. FIG. 8 shows the actions which can be performed by an input device, such as a mouse and effect of selection. In the left column it is shown that selecting may be done by a particular clicking operation. Clicking a particular mouse button starts a brief delay, for example 500 milliseconds. If within this delay a further clicking occurs, the number of clicks is accumulated. If no clicking occurs within this delay, a subsequent clicking resets the accumulated sum (to one). The maximum accumulation is three in this example. The right column shows the effect. Single click selects the actual cursor position. Double click selects the word or pseudo word at the actual cursor position. The first space character to the left and right of the cursor act as delimiters to the selection. Triple click likewise selects the whole line of characters or pseudo characters. The last line in Tab 8 shows the effect of dragging. Dragging is the same as clicking but holding the clicking button while moving the mouse (or rather, its on-screen representation) to an intended destination position. If the button is accidentally deactivated somewhere, that is the destination position. Dragging selects all (pseudo) characters between the start position and the destination position: this means all characters along the line of the start position to the right of the start position and all characters on the line of the destination position to the left of the destination position, and all intermediate lines completely. If the two positions are on one single line, only the interval on that line is selected. In principle, dragging could be combined with plural clicking, but this has not been considered.

Now, FIG. 9 shows what happens to the (pseudo) characters after selection according to the actions of FIG. 8. The set of commands in the left hand column may be activated by a particular dedicated key or button on the keyboard, by a software defined key on the keyboard, or by a soft key on a displayed soft keyboard. The set of commands is as follows:

a. Command TYPE/RECORD: the characters in the selected region are deleted from the page and the newly typed or recorded characters are inserted in the actual cursor position while continuously keeping actual text appropriately spaced.

b. command CUT: this deletes all (pseudo) characters selected, closes up the (pseudo) text, and puts the selected information on the so-called CLIPBOARD, which is a particular dedicated memory area that is always directly accessible from the keyboard. If a plurality of windows have been activated in succession, the information present in the clipboard always remains linked to the window that originated such information. The clipboard itself does not provide cross-window transportability. If such transportability were required, a special additional command is required to directly associate the deleted characters with the destination window that must then be operated directly. If a succession of CUT commands is given in succession, the information deleted is stacked and can be recalled in a last-in-first-out sequence. In another realization a first-in-first-out organization might be preferable, however.

c. command COPY: this, likewise, puts the selected information on the clipboard, but without deleting the selected information at its original location.

d. command PASTE: if applicable, delete the selected information (if more than one pseudo character is selected) and insert the clipboard information on the position(s) so selected. If the latter information is too large, insertion will let the amount of information grow. On the other hand, if the new information is less than the original information the amount of information will contract so that the resulting information is appropriately spaced.

c. command DELETE: the selected information is deleted, and the subsequent information contracts so that the resulting text is appropriately spaced.

Of course, the information may be manipulated in various other ways in addition to the above subset of activations, but nevertheless in combination therewith. For example, fax information may be underlined. For another, audio information may be dubbed, loudness-clipped or other. This could be done, either in the context where the pseudo-characters of the associated communication medium occur, or in a completely separate setting.

In conclusion, the uniform interface for various communication media produces an easier accessibility. For brevity, the software has not been extensively disclosed, as this was considered to closely parallel that for text only, which is standard in various packages that are available commercially.

I claim:

1. A text system comprising:
pagewise text display means for displaying text based on character representability, text processing means for processing the text, text storage means for storing the text, input means for editing the text and a user interface featuring a set of text editing actions each activatable through a respective mechanical user actuation of the input means, said display means having an audio display mode for displaying stored audio based on line-wise representation of discrete pseudo characters, said audio display mode featuring at least a first subset of said set of text editing actions operating on the displayed line-wise pseudo character representation in the same way as on displayed text, each of the audio editing actions having a mapped effect on the stored audio corresponding to the displayed pseudo character representation, and said pseudo characters vary in at least one of size and color to represent a parameter of the audio information.

2. A text processing system as claimed in claim 1, wherein said audio is voice at a linewise display scale that is comparable to text display, and further including delimiters as signalizations of detected silence instants.

3. A text processing system as claimed in claim 2, wherein said display means has a facsimile display mode based on linewise representation of facsimile information, said facsimile information being text or other symbology represented by a bit map, the facsimile mode having at least a second subset of said text editing actions operating on displayed facsimile information in a similar way as on displayed text.

4. A text processing system as claimed in claim 1, wherein said display means has a facsimile display mode based on linewise representation of facsimile information, said facsimile information being character or other symbology represented by a bit map, the facsimile mode having at least a second subset of said text editing actions operating on displayed facsimile information in the same way as on displayed text.

5. A text processing system as claimed in claim 4 further including skew correcting means for under user control correcting skew of a particular line of facsimile information.

6. A text processing system according to claim 5, wherein said facsimile information is linewise represented as further pseudo characters.

7. A text processing system as claimed in claim 4 further including orientation detection means for detecting a local orientation of a displayed facsimile information text line for allowing word and/or line select by the actions along a so detected line.

8. A text processing system according to claim 7, wherein said facsimile information is linewise represented as further pseudo characters.

9. A text processing system according to claim 4, wherein said facsimile information is linewise represented as further pseudo characters.

10. A text processing system as claimed in claim 4, wherein said first and second subsets are identical.

11. A text processing system as claimed in any of claim 1, wherein said pseudo characters have two variable attributes assigned thereto.

12. A system according to claim 1, wherein the frequency of the audio information is represented by one of size and color of the pseudo characters.

13. A system for processing multimedia information in the form of text, audio and facsimile information, said system comprising:

means for inputting text, audio and facsimile information, said facsimile information being characters or other symbology represented by a bit map;

means for representing the text as discrete text characters and for representing the audio information and the facsimile information each as discrete pseudo characters;

means for displaying the text characters and the pseudo characters; and editing means for editing the displayed information displayed as text characters and/or pseudo characters, said editing means including a plurality of common editing functions common to the text information displayed as text characters and the audio information and facsimile information displayed as discrete pseudo characters, said editing means including user input means actuatable by a user for activating each editing function through a respective user actuation of the input means, each of the common editing functions, when actuated by the user, operating on the displayed information in substantially the same way, irregardless of whether the displayed information is text information displayed as text characters or audio or facsimile information displayed as discrete pseudo characters, and for the pseudo characters each editing function having a mapped effect between the edited pseudo characters and the corresponding audio or facsimile information represented by the edited pseudo characters.

14. A system as claimed in claim 13 further including skew correcting means for under user control correcting skew of a particular line of facsimile information.

15. A system as claimed in claim 13 further including orientation detection means for detecting a local orientation of a displayed facsimile text line for allowing word and/or line select by the user editing actuations along a so detected line.

16. A system as claimed in claim 13, wherein said pseudo characters have two variable attributes assigned thereto.

17. A system as claimed in claim 13, wherein said pseudo characters have variable size and color attributes.

18. The system of claim 13, wherein the pseudo-characters vary in size and color.

19. A system according to claim 13, wherein said means for representing includes means for detecting individual words of said facsimile information and for providing a word raster around each word.

20. A system according to claim 19, wherein said word rasters are said pseudo characters for facsimile information.

21. A system according to claim 19, wherein said individual detected words are each represented by a said discrete pseudo character.

22. A system as claimed in claim 19 further including orientation detection means for detecting a local orientation of a displayed facsimile text line for allowing word and/or line select by the user editing actuations along a so detected line.

* * * * *